United States Patent
Mayhew

(10) Patent No.: US 7,957,293 B2
(45) Date of Patent: Jun. 7, 2011

(54) SYSTEM AND METHOD TO IDENTIFY AND COMMUNICATE CONGESTED FLOWS IN A NETWORK FABRIC

(75) Inventor: David Mayhew, Northborough, MA (US)

(73) Assignee: Jinsalas Solutions, LLC, Dover, DE (US)

( * ) Notice: Subject to any disclaimer, the term of this patent is extended or adjusted under 35 U.S.C. 154(b) by 0 days.

(21) Appl. No.: 12/692,183

(22) Filed: Jan. 22, 2010

(65) Prior Publication Data

US 2010/0118703 A1    May 13, 2010

Related U.S. Application Data

(63) Continuation of application No. 10/861,794, filed on Jun. 4, 2004, now Pat. No. 7,672,243.

(51) Int. Cl.
*H04L 12/26* (2006.01)
*H04L 12/28* (2006.01)

(52) U.S. Cl. ............................ 370/236; 370/392; 370/412

(58) Field of Classification Search .................. 370/392
See application file for complete search history.

(56) References Cited

U.S. PATENT DOCUMENTS

| | | | |
|---|---|---|---|
| 5,313,454 A * | 5/1994 | Bustini et al. ................. | 370/231 |
| 5,841,773 A | 11/1998 | Jones | |
| 5,970,048 A | 10/1999 | Pajuvirta et al. | |
| 5,987,008 A | 11/1999 | Simpson et al. | |
| 6,031,821 A | 2/2000 | Kalkunte et al. | |
| 6,115,356 A | 9/2000 | Kalkunte et al. | |
| 6,201,810 B1 | 3/2001 | Masuda et al. | |
| 6,363,052 B1 | 3/2002 | Hosein | |
| 6,424,627 B1 | 7/2002 | Sorhaug et al. | |
| 6,570,848 B1 | 5/2003 | Loughran et al. | |
| 6,636,512 B1 * | 10/2003 | Lorrain et al. ................. | 370/392 |
| 6,678,244 B1 | 1/2004 | Appanna et al. | |
| 6,721,273 B1 | 4/2004 | Lyon | |
| 6,985,500 B2 | 1/2006 | Ambiehl et al. | |
| 6,996,658 B2 | 2/2006 | Brocco et al. | |
| 7,023,857 B1 | 4/2006 | Chiussi et al. | |
| 7,027,457 B1 | 4/2006 | Chiussi et al. | |
| 7,035,212 B1 | 4/2006 | Mittal et al. | |
| 7,062,581 B2 | 6/2006 | Brocco et al. | |
| 7,133,955 B2 | 11/2006 | Mayhew et al. | |
| 7,146,452 B2 | 12/2006 | Brocco et al. | |
| 7,155,557 B2 | 12/2006 | Meier | |
| 7,215,639 B2 | 5/2007 | De Maria et al. | |
| 7,286,552 B1 | 10/2007 | Gupta et al. | |
| 7,443,869 B2 | 10/2008 | Solomon et al. | |

(Continued)

OTHER PUBLICATIONS

Official Action in U.S. Appl. No. 10/861,794 dated Sep. 18, 2007, 8 pages.

(Continued)

*Primary Examiner* — Seema S Rao
*Assistant Examiner* — Wanda Z Russell

(57) ABSTRACT

The invention provides a system and method for identifying and communicating congested paths throughout a network fabric. Briefly, the present invention augments the congestion management mechanism defined in ASI to allow for the communication of congested paths through the fabric, rather than the simple congested output port notification supported today through the use of DLLPs. Further, it also uses the communication mechanisms already defined in the ASI specification to implement this additional capability. Specifically, the present invention uses Transaction Layer Packets (TLPs) to communicate the information concerning congested flows throughout the network. This packet type allows the inclusion of much more information than DLLPs, allowing a more comprehensive and elegant solution to the issue of congestion management in an Advanced Switching network fabric.

22 Claims, 3 Drawing Sheets

Typical Network Configuration

U.S. PATENT DOCUMENTS

| | | |
|---|---|---|
| 7,451,282 B2 | 11/2008 | Meier et al. |
| 7,518,996 B2 | 4/2009 | Mayhew et al. |
| 7,573,827 B2 | 8/2009 | Santos et al. |
| 2002/0089934 A1 | 7/2002 | Sokhin et al. |
| 2002/0118641 A1 | 8/2002 | Kobayashi |
| 2002/0122410 A1 | 9/2002 | Kulikov et al. |
| 2002/0145982 A1 | 10/2002 | Talpade et al. |
| 2003/0115355 A1 | 6/2003 | Cometto et al. |
| 2004/0015561 A1 | 1/2004 | Mayhew et al. |
| 2004/0042402 A1 | 3/2004 | Galand et al. |
| 2004/0109412 A1 | 6/2004 | Hansson et al. |
| 2004/0128410 A1 | 7/2004 | Mayhew et al. |
| 2005/0080976 A1 | 4/2005 | Brocco et al. |
| 2005/0141429 A1 | 6/2005 | Jayakrishnan et al. |
| 2005/0270974 A1 | 12/2005 | Mayhew |
| 2006/0050691 A1 | 3/2006 | Meier |
| 2006/0104275 A1 | 5/2006 | Dohm |
| 2007/0071005 A1 | 3/2007 | Mayhew et al. |

OTHER PUBLICATIONS

Response to Official Action in U.S. Appl. No. 10/861,794 dated Sep. 18, 2007, mailed Dec. 20, 2007, 16 pages.
Official Action in U.S. Appl. No. 10/861,794 dated Feb. 20, 2008, 8 pages.
Response to Official Action in U.S. Appl. No. 10/861,794 dated Feb. 20, 2008, mailed May 6, 2008, 10 pages.
Official Action in U.S. Appl. No. 10/861,794 dated Jul. 25, 2008, 11 pages.
Response to Official Action in U.S. Appl. No. 10/861,794 dated Jul. 25, 2008, mailed Jan. 26, 2009, 20 pages.
Official Action in U.S. Appl. No. 10/861,794 dated Mar. 10, 2009, 14 pages.
Response to Official Action in U.S. Appl. No. 10/861,794 dated Mar. 10, 2004, mailed Jul. 10, 2009, 22 pages.
Notice of Allowability in U.S. Appl. No. 10/861,794 dated Oct. 7, 2009, 5 pages.

* cited by examiner

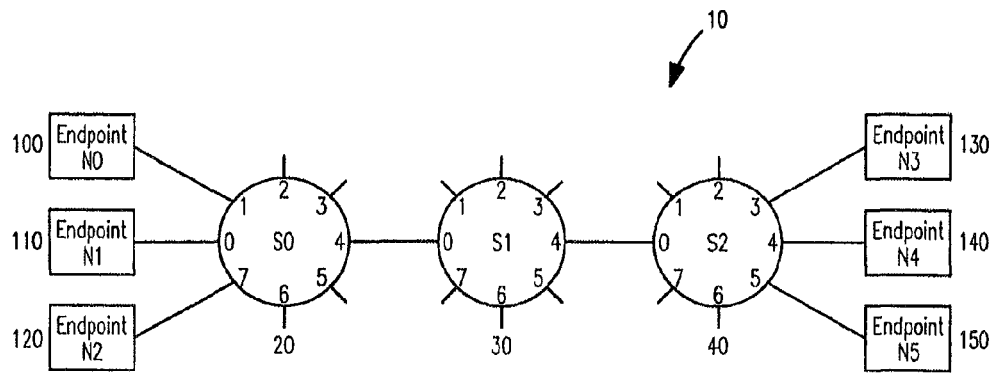

Typical Network Configuration

FIG. 1

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| S3 Output Port | | | | S2 Output Port | | | | S1 Output Port | | | | S0 Output Port | | | |
| Other Packet Fields ||||||||||||||||
| Other Packet Fields ||||||||||||||||
| Other Packet Fields ||||||||||||||||

Example packet header using path-based routing

FIG. 2

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Header CRC |||||||| Turn Pointer ||||| FECN | Credits Required ||||| TS | 00 || Traffic Class ||| PCRC | P | Protocol Interface ||||||
| D | Turn Pool |||||||||||||||||||||||||||||||

TS = Type Specific    00 = Ordered Only
CRC = Cyclic Redundancy Check    P = Perishable
D = Direction    PCRC = Packet CRC
FECN = Forward Explicit Congestion Notification Packet header in accordance with AS specification

FIG. 3

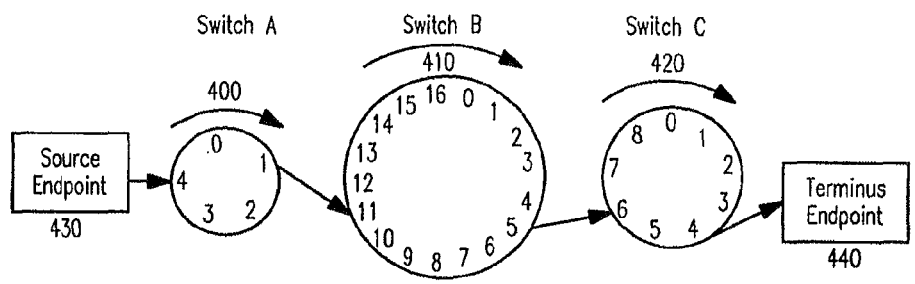
Example of forward routing using AS
FIG. 4
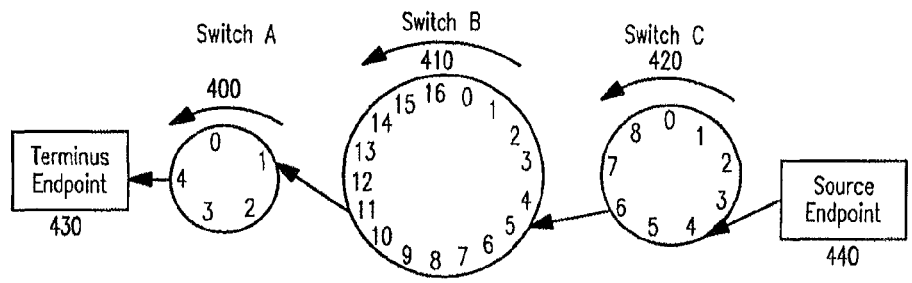
Example of backward routing using AS
FIG. 5
| 31 | 30 | 29 | 28 | 27 | 26 | 25 | 24 | 23 | 22 | 21 | 20 | 19 | 18 | 17 | 16 | 15 | 14 | 27 | 26 | 11 | 10 | 9 | 8 | 7 | 6 | 5 | 4 | 3 | 2 | 1 | 0 |
|----|----|----|----|----|----|----|----|----|----|----|----|----|----|----|----|----|----|----|----|----|----|---|---|---|---|---|---|---|---|---|---|
| DLLP Type =101 | | - | | XQFF | | Port Turn Number | | | | | | | | | 0 | TCMask[7:0] | | | | | | | Reserved | | | | | | | | |
| CRC | | | | | | | | | | | | | | | | | | | | | | | | | | | | | | | |
Data Link Layer Packet as defined in AS
FIG. 6

Transaction Layer Packet per present invention

SYSTEM AND METHOD TO IDENTIFY AND COMMUNICATE CONGESTED FLOWS IN A NETWORK FABRIC

The present application is a continuation of U.S. application Ser. No. 10/861,794, filed Jun. 4, 2004 now U.S. Pat. No. 7,672,243, which is incorporated by reference in the present application in its entirety.

BACKGROUND OF THE INVENTION

In computer networks, information is constantly being moved from a source to a destination, typically in the form of packets. In the simplest situations, the source and destination are directly connected and the packet of information passes from the source to the destination, without any intermediate stages. However, in most networks, there are at least one, if not multiple, intermediate stages between the source and the destination. In order for the information to move from the source to the destination, it must be routed through a set of devices that accept the packet and pass it along a predetermined path toward the destination. These devices, referred to generically as switches, are typically configured to accept packets from some number of input ports and transmit that information to an output port, which was selected from a plurality of ports. Often, ports are capable of both receiving and transmitting, such that the input and output ports are the same physical entities.

In an ideal network, traffic arrives at an input port of a switch. The switch determines the appropriate destination for the packet and immediately transmits it to the correct output port. In such a network, there is no need for storing the packet of information inside the switch, since the switch is able to transmit the packet as soon as it receives it.

However, because of a number of factors, this ideal behavior is not realizable. For instance, if the switch receives packets on several of its input ports destined for the same output port, the switch must store the information internally, since it cannot transmit all of these different packets of information simultaneously to the same output port. In this case, the output port is said to be "congested". This term also describes the situation in which the device to which this output port is connected is unable to receive or process packets at the rate at which they arrive for some reason. In such a case, the switch must store the packet destined for that output port internally until either the offending device is able to receive more information or the packet is discarded.

Patent application Ser. No. 10/794,067, which is hereby incorporated by reference, describes a system and method of implementing multiple queues within a switching element to store packets destined for congested paths. Briefly, the switch determines the path of the packet, specifically, the action to be taken by the adjacent downstream switch, to determine whether it is destined for a congested path. The packet header contains the path of the packet as defined by the successive actions taken by each switching element. In other words, the header might specify the output port to be used by each switch in the path. The switching element compares this path specified in the header to its list of known congested paths. Based on that comparison, the switching element either forwards the packet or moves it to a special congested flow queue, where it remains until either a specific time period has passed or the path is no longer congested. That patent application describes several mechanisms by which a switch is notified of congested paths. One technique is known as Status Based Flow Control, where a downstream node explicitly informs an upstream node that at least one of its output ports is congested. This can be accomplished in the form of a message telling the sender to stop transmitting packets that are to be sent via the congested output port, followed by a second message telling it to resume when the congestion is resolved. Alternatively, the destination might transmit a message telling the source to stop transmitting packets destined for the offending output port for a specific time period.

ASI (Advanced Switching Interconnect) is an industry standard protocol, based on the PCI Express specification. Advanced Switching (AS) allows for the standardization of today's proprietary based backplanes. Advanced Switching uses the same physical-link and data-link layers as the PCI Express architecture, taking advantage of the tremendously large ecosystem. AS is a multi-point, peer-to-peer switched interconnect standard offering encapsulation of any protocol, multiple messaging mechanisms, QoS including congestion management, extended high availability features and much more. The ASI specification is written, updated and maintained by the ASI SIG (Special Interest Group) and the current version of the specification can be found at www.asi-sig.org/members/Core AS Rev1 0.pdf, and is hereby incorporated by reference. Similarly, the PCI Express specification is written, updated and maintained by the PCI SIG and the current specification can be found at www.pcisig.org/members/downloads/specifications/pciexpress/pciexpress base 10a.pdf, and is also hereby incorporated by reference.

ASI defines a mechanism by which upstream switches are notified of downstream congestion. Specifically, a switch which is experiencing congestion at one of its output ports can transmit a special message, known as a Data Link Layer Packet (DLLP) to an adjacent upstream switch. This DLLP contains multiple fields, one of which contains the output port that is experiencing the congestion and another that specifies the desired action that the upstream switch should take in response to the congestion. This mechanism is very effective to communicate congestion in one switch to the adjacent switch, however, it is specifically limited to this application. The format of a DLLP does not allow this mechanism to scale to identify congested paths through the entire fabric.

Thus, while congestion is reduced since traffic is no longer being sent to the congested port, there are undesirable effects of this scheme. Consider the scenario where there are three switches, A, B and C, in series. Assume that the most downstream switch, C, experiences congestion at its output port 5. It communicates this information back to its adjacent switch, B, which now stops transmitting packets destined for output port 5 of the next switch. Assume that all such packets are transmitted via output port 3 of the intermediate switch B. These packets are then stored in a congestion queue, waiting for the congestion to pass. At a later time, this intermediate switch B cannot store any more packets destined for output port 5 of the downstream switch. Since DLLPs only permit the switch to identify its congested port, the intermediate switch B sends a DLLP to the upstream switch A, informing it that its output port 3 is experiencing congestion. At this point, the upstream switch A stops transmitting packets destined to be transmitted via output port 3 of the intermediate switch B.

This behavior is an appropriate response to the congestion issue presented above, however, there were packets in upstream switch A which could have been sent, which are not, because of the limitations of the DLLP mechanism. Specifically, any packet in upstream switch A destined for output port 3 of intermediate switch B will be held. However, only packets destined to be transmitted by output port 5 of downstream switch C truly needed to be held. Thus, any packet in upstream switch A which is transmitted via output port 3 of intermediate switch B, and was then intended to be transmitted via output port 7 of downstream switch C is unnecessarily held. Similarly, any packet in upstream switch A destined to be transmitted via any output port in downstream switch C except output port 5 will unnecessarily be held in upstream switch A. This reduces the throughput of the fabric and increases latency.

Therefore, it is an objective of the present invention to define a mechanism that enables the fabric to identify and communicate not only congested output ports, but also congested paths to all interested switches throughout the network fabric. It is a further objective of the present invention to define this mechanism in such a way that it can be incorporated into the ASI specification in a backward compatible manner.

SUMMARY OF THE INVENTION

The problems with the prior art have been overcome with this invention, which provides a system and method for identifying and communicating congested paths throughout a network fabric. Briefly, the present invention augments the congestion management mechanism defined in ASI to allow for the communication of congested paths through the fabric, rather than the simple congested output port notification supported today through the use of DLLPs. Further, it also uses the communication mechanisms already defined in the ASI specification to implement this additional capability. Specifically, the present invention uses Transaction Layer Packets (TLPs) to communicate the information concerning congested flows throughout the network. This packet type allows the inclusion of much more information than DLLPs, allowing a more comprehensive and elegant solution to the issue of congestion management in an Advanced Switching network fabric.

BRIEF DESCRIPTION OF THE DRAWINGS

FIG. 1 illustrates a typical network and network fabric topology, containing several intermediate stages between the source and the destination;

FIG. 2 illustrates an exemplary packet header showing the path that the packet will take through the network or fabric;

FIG. 3 illustrates a packet header in accordance with the Advanced Switching specification showing the path that the packet will take through the network or fabric;

FIG. 4 illustrates an exemplary packet forward routed through a network fabric and illustrates the associated turn pool and turn pointer values in accordance with the AS specification;

FIG. 5 illustrates an exemplary packet backward routed through a network fabric and illustrates the associated turn pool and turn pointer values in accordance with the AS specification;

FIG. 6 illustrates the format of the Data Link Layer Packet, as defined by the Advanced Switching Interconnect specification.

DETAILED DESCRIPTION OF THE INVENTION

Figure 7:
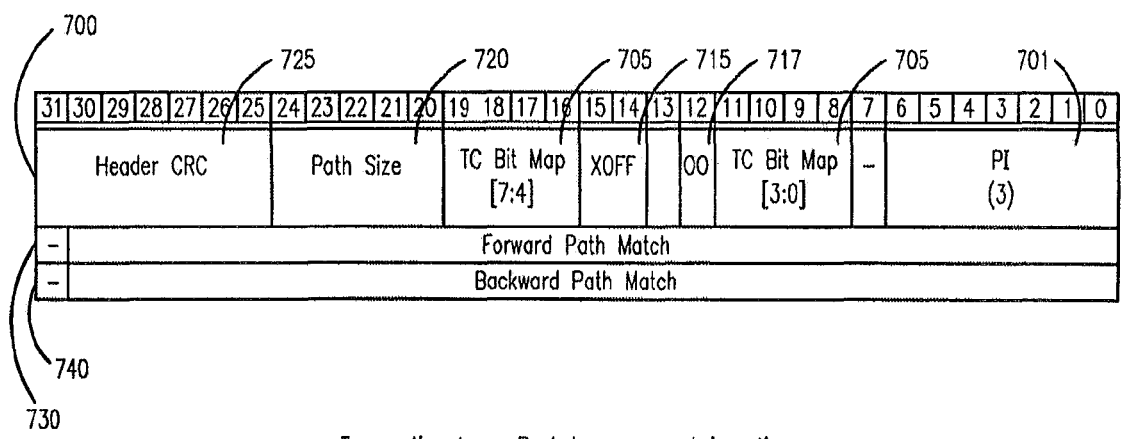
FIG. 7 illustrates the format of the new Transaction Layer Packet in accordance with the present invention.

Within computer networks, systems, also known as fabrics, are designed that allow multiple nodes, or endpoints to communicate with one another. FIG. 1 illustrates a configuration used in the creation of such a fabric. Fabric 10 is comprised of a number of devices, or nodes, that are interconnected to one another. These devices, broadly known as switches, are capable of receiving packets of information via a plurality of input ports and then transmitting these packets via a plurality of output ports, preferably via an output port that is different than the input port. When a number of these are connected together, it is possible to create a fabric whereby multiple endpoints are able to communicate with each other via the various paths that are established by the switches. Within fabric 10, three switches, 20, 30 and 40 are shown. Most fabrics are more complex than this example, with additional switches connected to the unused outputs of switches 20, 30, and 40. There is no theoretical maximum on the total number of switches, the number of switches between the endpoints, or the configuration of the fabric and this invention is capable of working in any configuration. Within a fabric, the ports of each switch are connected in a point-to-point fashion with ports from other switches. A port on one switch is connected to a single port on another switch, via a point-to-point interconnection, preferably via a cable, backplane or wires. Two switches that share an interconnection such that one port of the first switch is in direct communication with one port of the second switch via the shared interconnection are said to be adjacent to one another. In FIG. 1, switch 30 is adjacent to both switch 20 and switch 40. Similarly, switch 20 is adjacent to switch 30 and endpoints 100, 110 and 120. Specifically, port 4 of switch 20 is in direct communication with port 0 of adjacent switch 30. Even though physical elements such as cables, filters, back planes, EMI control logic or other devices may exist between port 4 of switch 20 and port 0 of switch 30, these two ports are defined to be adjacent and in direct communication since there are no other switches in the direct path between these two ports.

Attached to switch 20 via point-to-point connections are endpoints 100, 110 and 120. These endpoints may be computing devices, such as personal computers or servers. They may also be other networking devices, such as, but not limited to, routers, wiring closet switches, or gateways. Attached to switch 40 via point-to-point connections are endpoints 130, 140 and 150, which may also be any of the categories previously described. The number of switches and endpoints in this figure is solely for illustrative purposes and the invention is not to be limited by the number of either. Using fabric 10, any endpoint in FIG. 1 can communicate to any other endpoint. In some cases, this is accomplished by using only a small part of the fabric. This is the case when endpoint 100 communicates with endpoint 120. Only switch 20 is involved in transferring packets between these endpoints. In other situations, many more switches are involved in the communications between two endpoints, such as is the case between endpoint 100 and endpoint 150. In this case, endpoint 100 communicates to switch 20, which forwards the packet to switch 30, which in turn forwards it to switch 40, which forwards the packet to its ultimate destination, endpoint 150.

Advanced Switching also defines a mechanism known as loopback, by which a packet is transmitted via the same port on which it was received. For example, a packet sent from endpoint 120 to endpoint 100 could be routed via switch 30. In this scenario, endpoint 120 communicates with switch 20, which forwards the packet to switch 30, which then forwards the packet back to switch 20, which finally forwards it to endpoint 100. There are several reasons that a packet could potentially be routed via loopback, rather than via the shortest path. For example, endpoint 100 may implement a policy by which the other endpoints receive an equal amount of bandwidth when transmitting packets to it. This policy may be more easily implemented by having all incoming traffic enter switch 20 via switch 30. Therefore, endpoints 110 and 120 might use loopback to follow this fairness policy.

When a packet is received by switch 20, it examines that packet to determine which output port it should transmit the packet to. There are multiple methods whereby switch 20 can determine the correct output port, based on the routing policies used in the fabric. For example, destination address based routing allows the switch to select the output port based on the ultimate destination of the packet. The switch may contain an internal table that associates each destination address with an output port. When switch 20 receives a packet, it determines the destination address of the packet, indexes into its table and selects the appropriate output port. Path based routing is an alternative method of routing packets through a fabric. In this scenario, the packet header contains the path that the packet is to follow. One example of path based routing is illustrated in FIG. 2, where the header of a packet is shown. Embedded in the header is the path that the packet should take. In this simple example, the path is divided into 4 bit fields. Each of these 4 bit fields corresponds to the output port that should be used by a specific switch. As an example, switch 20 would look at bits <3:0> to determine which output port it should transmit on; then switch 30 would look at bits <7:4> to determine its output port and finally switch 40 would look at bits <11:8> to determine its output port. Referring back to FIG. 1, if the packet contained the string 344, the packet would be transmitted via output port 4 of switch 20, output port 4 of switch 30 and output port 3 of switch 40. Therefore, this string defines the path to endpoint 130. Similarly, a packet employing loopback can be constructed to send information from endpoint 120 to endpoint 100. In this scenario, switch 20 would look at bits <3:0> to determine which output port it should transmit on; then switch 30 would look at bits <7:4> to determine its output port and finally switch 20 would look at bits <11:8> to determine its output port. Thus, a packet containing the string 104 would be transmitted via output port 4 of switch 20 to switch 30. Then it would be transmitted via output port 0 on switch 30 back to switch 20. Finally, it would be transmitted via output port 1 to endpoint 100. There are numerous variations of this simple approach to path based routing. For example, rather than specifying the output port of a switch, the packet may specify the relative position of the output port as compared to the input port. In this scenario, bits <3:0> would specify the number of turns in a clockwise direction that exist between the input port and the output port. A path originating at endpoint 120 would set bits <3:0> to 0, if it wished the packet to be routed to endpoint 110, since there are no turns in a clockwise direction between these two ports. To send a packet to endpoint 130, endpoint 120 would set bits <3:0> to 4 to direct the packet to switch 30. Continuing on, it would set bits <7:4> to 3 to direct the packet to switch 40, and finally it would set bits <11:8> to 2 to direct the packet to its ultimate destination, endpoint 130. This description of path based routing is only meant to illustrate the principles defining the protocol.

The AS (Advanced Switching) protocol uses a variant of the "turn" mechanism previously defined. FIG. 3 shows the header of a typical AS packet. Included in this header is a field known as the Turn Pool 300, a second field known as the Turn Pointer 310 and a Direction flag 320. The Turn Pool 300 is analogous to bits <11:0> in FIG. 2, in that these bits represent the turn value for the switches that are in the path of transmission. However, unlike FIG. 2, AS allows non-uniform sized switches, therefore, it is not possible to divide this field into smaller subfields, without knowing the specific fabric and switch topology. For example, a switch with 9 output ports that does not employ loopback requires 3 bits to uniquely express the turn value, since there are 8 other ports that the packet can be transmitted via; while a switch with 5 output ports only requires 2 bits of Turn Pool.

Therefore, an index into the Turn Pool is used to inform each switch of the relevant bits in the Turn Pool which correspond to its turn number. This index value, known as the Turn Pointer field, is set by the source node originally sending the packet, and is decremented by each switch according to its port count. In other words, a switch, which does not support loopback, containing 17 output ports uses the next 4 bits in the Turn Pool field, while a switch with 9 output ports uses only the next 3 bits in the Turn Pool field. In each case, the switch decrements the turn index by the number of bits that it used.

Advanced Switching specifies that the maximum number of ports that a switch without loopback can have is represented by:

$2^N+1$, where N is the number of bits that it uses in the Turn Pool.

Furthermore, a switch with loopback is limited to one fewer port, namely:

$2^N$, where N is the number of bits that it uses in the Turn Pool.

This difference is due to the fact that the AS specification reserves the turn value represented in binary as all "1"s for loopback (i.e. $2^N-1$, where N is the number of bits the switch uses in the Turn Pool), in those switches that support it, thus reducing the maximum number of ports by one. For example, assume a switch with 9 ports that does not support loopback. The maximum turn value is between any port and the port immediately counterclockwise from it (since turn values are calculated in the clockwise direction). This turn value would be 7. However, if the switch supports loopback, the turn value of 7, which is "111", is reserved for loopback. This implies that the maximum turn value between a port and its immediately adjacent counterclockwise port must be no greater than 6. Therefore, a switch supporting loopback, which uses 3 bits of turn value, can only have a maximum of 8 ports.

FIG. 4 illustrates an exemplary use of the Turn Pool and the Turn Pointer. Assume that all switches in this Figure do not support loopback. In this figure, Switch A 400 contains 5 output ports, thus requiring 2 bits of Turn Pool to uniquely identify the appropriate output port. Similarly, switch B 410 contains 17 output ports, thus requiring 4 bits of Turn Pool, and switch C 420 contains 9 output ports, thus requiring 3 bits of Turn Pool. In this example, source endpoint 430 writes the appropriate values into the Turn Pointer and Turn Pool fields. When switch A 400 receives the packet, it determines that the Turn Pointer is 9. It then uses this value to index into the Turn Pool. Specifically, according to the AS specification, the Turn Pointer value represents the bit position of the most significant bit of its turn value, plus one. In other words, a Turn Pointer of 9 indicates that bit 8 is the most significant bit of switch A's turn value. Since switch A 400 is a 5-port switch, it requires 2 bits to specify the output port, thus Turn Pool bits <8:7> represent the turn value used by switch A 400. Looking at the Turn Pool field, these bits are 01, as indicated in line 2 of the chart accompanying FIG. 4. Therefore, switch A 400 selects output port 1, using the technique described above for relative turns in reference to FIG. 2. Since switch A 400 used 2 bits of the Turn Pool field, it decrements the Turn Pointer field by 2, thereby changing it to 7, before forwarding the packet to switch B 410.

Switch B 410 repeats this process. A Turn Pointer value of 7 indicates that bit 6 of the Turn Pool is the most significant bit of its turn value. Since switch B 410 is a 17 port switch, it requires 4 bits to represent all possible output ports, therefore switch B 410 uses bits <6:3> as its turn value. Line 3 of the chart indicates that these bits represent the value 1010 (or ten), which corresponds to output port 5 in FIG. 4. Since switch B 410 used 4 bits of the Turn Pool field, it decrements the Turn Pointer field by 4, thereby changing it to 3, before forwarding the packet to switch C 420.

Switch C 420 repeats this process as well. A Turn Pointer value of 3 indicates that bit 2 of the Turn Pool is the most significant bit of its turn value. Since switch C 420 is a 9-port switch, it requires 3 bits to represent all possible output ports. Therefore switch C 420 uses bits <2:0> as its turn value. Line 4 of the chart indicates that these bits represent the value 110 (or 6), which corresponds to output port 4 in FIG. 4. Since switch C 420 used 3 bits of the Turn Pool field, it decrements the Turn Pointer field by 3, thereby changing it to 0, before forwarding the packet to the terminus endpoint 440.

To verify that the packet was properly delivered, the terminus endpoint 440 verifies that the Turn Pointer field has been decremented to zero when it arrives.

Note that this mechanism illustrated in FIG. 4 works identically with switches that support loopback, with the modification that all of the switches illustrated in the figure must each have one fewer port.

To further describe the operation with loopback, refer to FIG. 1, and assume that Endpoint 100 wishes to send a packet to endpoint 110, which is to be transmitted via switch 30. Assume that all switches in this Figure support loopback. In this figure, Switch 20, Switch 30 and Switch 40 each contain 8 output ports, thus requiring 3 bits of Turn Pool to uniquely identify the appropriate output port. In this example, endpoint 100 writes the appropriate values into the Turn Pointer and Turn Pool fields. In order to transmit a packet to endpoint 110, endpoint 100 writes a Turn Pointer of 9, with a Turn Pool of 010111011. When switch 20 receives the packet, it determines that the Turn Pointer is 9. It then uses this value to index into the Turn Pool. Specifically, according to the AS specification, the Turn Pointer value represents the bit position of the most significant bit of its turn value, plus one. In other words, a Turn Pointer of 9 indicates that bit 8 is the most significant bit of switch A's turn value. Since switch 20 is a 8-port switch, it requires 3 bits to specify the output port, thus Turn Pool bits <8:6> represent the turn value used by switch 20. Looking at the Turn Pool field, these bits would be 010. Therefore, switch 20 selects output port 4, using the technique described above for relative turns in reference to FIG. 2. Since switch 20 used 3 bits of the Turn Pool field, it decrements the Turn Pointer field by 3, thereby changing it to 6, before forwarding the packet to switch 30.

Switch 30 repeats this process. A Turn Pointer value of 6 indicates that bit 5 of the Turn Pool is the most significant bit of its turn value. Since switch 30 is a 8-port switch, it requires 3 bits to represent all possible output ports, therefore switch 30 uses bits <5:3> as its turn value. Thus, its turn value would be 111, which is defined in the AS specification as the loopback value. Therefore, the packet will be routed back via output port 0, from which it originated. Since switch 30 used 3 bits of the Turn Pool field, it decrements the Turn Pointer field by 3, thereby changing it to 3, before forwarding the packet to switch 20.

Switch 20 repeats this process again. A Turn Pointer value of 3 indicates that bit 2 of the Turn Pool is the most significant bit of its turn value. Switch 20 uses bits <2:0> as its turn value, which represent the value 011 (or 3). This corresponds to output port 0. Since switch 20 used bits of the Turn Pool field, it decrements the Turn Pointer field by 3, thereby changing it to 0, before forwarding the packet to the endpoint 110.

To verify that the packet was properly delivered, the endpoint 110 verifies that the Turn Pointer field has been decremented to zero when it arrives.

Returning to FIG. 3, there is shown a Direction flag 320 defined in the packet header. In AS, packets are defined as being either forward routed, or backward routed. The Direction flag 320 is used to distinguish these two types of routing, where a value of zero for the Direction flag indicates a forward routed packet, while a value of one indicates a backward routed packet. FIG. 4 illustrates forward routing of an AS packet through a network fabric. FIG. 5 illustrates the backward routing of a packet through a similarly configured network.

FIG. 5 illustrates an exemplary use of the Turn Pool and the Turn Pointer in association with backward routed packets. In this figure, as in FIG. 4, all switches are assumed to not support loopback. Switch A 400 contains 5 output ports, thus requiring 2 bits of Turn Pool to uniquely identify the appropriate output port. Similarly, switch B 410 contains 17 output ports, thus requiring 4 bits of Turn Pool, and switch C 420 contains 9 output ports, thus requiring 3 bits of Turn Pool. In this example, the source endpoint 430 of FIG. 4 becomes the destination, while the previous terminus endpoint 440 from FIG. 4 becomes the source. Endpoint 440 uses the same Turn Pool as was used in FIG. 4, and has a Turn Pointer of 0. This packet is distinguished from the previous packet by the setting of the flag denoting the packet as a backward routed packet.

When switch C 420 receives the packet, it determines that the Turn Pointer is 0. It then uses this value to index into the Turn Pool. Specifically, according to the AS specification, the Turn Pointer value in a backward routed packet represents the bit position of the least significant bit of its turn value. In other words, a Turn Pointer of 0 indicates that bit 0 is the least significant bit of switch C's turn value. Since switch C 420 is a 9-port switch, it requires 3 bits to specify the output port, thus Turn Pool bits <2:0> represent the turn value used by switch C 420. Looking at the Turn Pool field, these bits are 110, as indicated in line 2 of the chart accompanying FIG. 5.

In backward routed packets, the turn pool indicates the number of ports between the ingress and egress ports in a counterclockwise direction. Therefore, switch C 420 selects output port 6, using the technique described above. Since switch C 420 used 3 bits of the Turn Pool field, it increments the Turn Pointer field by 3, thereby changing it to 3, before forwarding the packet to switch B 410.

Switch B 410 repeats this process. A Turn Pointer value of 3 indicates that bit 3 of the Turn Pool is the least significant bit of its turn value. Since switch B 410 is a 17-port switch, it requires 4 bits to represent all possible output ports, therefore switch B uses bits <6:3> as its turn value. Line 3 of the chart indicates that these bits represent the value 1010 (or ten). Moving in the counterclockwise direction, this corresponds to output port 11 in FIG. 5. Since switch B 410 used 4 bits of the Turn Pool field, it increments the Turn Pointer field by 4, thereby changing it to 7, before forwarding the packet to switch A 400.

Switch A 400 repeats this process as well. A Turn Pointer value of 7 indicates that bit 7 of the Turn Pool is the least significant bit of its turn value. Since switch A 400 is a 5-port switch, it requires 2 bits to represent all possible output ports, therefore switch A 400 uses bits <8:7> as its turn value. Line 4 of the chart indicates that these bits represent the value 01 (or 1), which corresponds to output port 4 in FIG. 5. Since switch A 400 used 2 bits of the Turn Pool field, it increments the Turn Pointer field by 2, thereby changing it to 9, before forwarding the packet to the terminus endpoint 430.

Again, this mechanism works in the same manner with switches that support loopback, with the modification that all switches must each have one less port. To further describe the operation with loopback, referring to FIG. 1, assume that Endpoint 110 wishes to send a backward routed packet to endpoint 100, which is to be transmitted via switch 30. Assume that all switches in this Figure support loopback. Switch 20, Switch 30 and Switch 40 each contain 8 output ports, thus requiring 3 bits of Turn Pool to uniquely identify the appropriate output port. Endpoint 110 uses the same Turn Pool as was used in describing loopback operation with respect to FIG. 1 (010111011), and has a Turn Pointer of 0. This packet is distinguished from the previous packet by the setting of the flag denoting the packet as a backward routed packet.

When switch 20 receives the packet, it determines that the Turn Pointer is 0. It then uses this value to index into the Turn Pool. Specifically, according to the AS specification, the Turn Pointer value in a backward routed packet represents the bit position of the least significant bit of its turn value. In other words, a Turn Pointer of 0 indicates that bit 0 is the least significant bit of switch 20's turn value. Since switch 20 is a 8-port switch, it requires 3 bits to specify the output port, thus Turn Pool bits <2:0> represent the turn value used by switch 20. Looking at the Turn Pool field, these bits are 011.

In backward routed packets, the turn pool indicates the number of ports between the ingress and egress ports in a counterclockwise direction. Therefore, switch 20 selects output port 4, using the technique described above. Since switch 20 used 3 bits of the Turn Pool field, it increments the Turn Pointer field by 3, thereby changing it to 3, before forwarding the packet to switch 30.

Switch 30 repeats this process. A Turn Pointer value of 3 indicates that bit 3 of the Turn Pool is the least significant bit of its turn value. Since switch 30 is a 8-port switch, it requires 3 bits to represent all possible output ports, therefore switch 30 uses bits <5:3> as its turn value. These bits correspond to the value 111 (or 7). In accordance with the AS specification, a value of 7 (for a 8-port switch) designates the loopback value, in both the forward and backward direction. Thus, Switch 30 will transmit this packet via output port 0, which is the port where the packet originated. Since switch 30 used 3 bits of the Turn Pool field, it increments the Turn Pointer field by 3, thereby changing it to 6, before forwarding the packet to switch 20.

Switch 20 repeats this process again. A Turn Pointer value of 6 indicates that bit 6 of the Turn Pool is the least significant bit of its turn value. Since switch 20 is a 8-port switch, it requires 3 bits to represent all possible output ports, therefore switch 20 uses bits <8:6> as its turn value, which represent the value 010 (or 2). This corresponds to output port 1 in FIG. 1. Since switch 20 used 3 bits of the Turn Pool field, it increments the Turn Pointer field by 3, thereby changing it to 9, before forwarding the packet to the endpoint 100.

It is important to note that there are two possible sets of Turn Pools and Turn Pointers for each path; one which represents the forward routed path and the second which represents the backwards routed path. Referring back to FIG. 5, if endpoint 440 sends a forward routed packet to endpoint 430, the Turn Pool would be set as follows:

Turn Pool<8:6> would be 001, which is the number of ports, in a clockwise direction between ingress port 4 and egress port 6 on Switch C 420.

Turn Pool<5:2> would be 0101, which is the number of ports, in a clockwise direction between ingress port 5 and egress port 11 on Switch B 410.

Turn Pool<1:0> would be 10, which is the number of ports, in a clockwise direction between ingress port 1 and egress port 4 on Switch A 400.

Thus, for a forward routed packet from endpoint 440 to endpoint 430, the Turn Pool would be 001010110. Similarly, this is the Turn Pool for a backward routed packet from endpoint 430 to endpoint 440.

Therefore, the values of the Turn Pools for packets originating at endpoint 430 and terminating at endpoint 440 would be:

011010110, in the forward direction, and 001010110, in the backward direction.

Although these numbers seem unrelated, there is a defined relationship between them. The forward Turn Pool can be written as 01 1010 110, where the separations exist between the turn values for each switch. Similarly, the backward Turn Pool can be written as 001 0101 10, where the separations exist between the turn values for each switch. Thus, the most significant bits of the forward Turn Pool correspond to Switch A 400, while the least significant bits of the reverse Turn Pool correspond to Switch A 400. Thus, the first step to creating the backward Turn Pool from the forward Turn Pool (or vice versa) is to use the network topology to identify the various turn values within the Turn Pool. The next step is to reverse the order of the turn values. Thus, forward Turn Pool 01 1010 110 is first rewritten as 110 1010 01.

The next step is to convert each turn value from a clockwise turn, to a counterclockwise turn. In a fully populated switch which does not support loopback (one which contains the maximum number of ports, i.e. $2^N+1$ ports, where N is the number of bits in the turn value), the conversion is achieved by inverting the bits. In a switch that is not fully populated, the conversion is performed as follows:

Backward turn value=#ports−forward turn value−2

Loopback introduces an exception to the above equation. As stated earlier, the forward turn value of the loopback port is all "1"s, or $2^N-1$, where N is the number of bits the switch uses in the Turn Pool. In other words, for an 8-port switch, the loopback value would be 111 (or 7). Similarly, for a 16-port switch, the loopback value would be 1111 (or 15). The backward turn value of the loopback port is also defined to be all "1"s, or $2^N-1$. Therefore, the forward routed turn value and backward routed turn value for the loopback port is always the same.

In the scenarios illustrated in FIGS. 4 and 5, all switches are fully populated and do not support loopback, therefore either the bits can be inverted or the equation above can be used. In either case, the resulting backward Turn Pool is rewritten as 001 0101 10. Note that this value is the same as that determined empirically by using FIG. 5 earlier.

Referring to the example used in conjunction with FIG. 1, it was determined that the forward Turn Pool from endpoint 100 to endpoint 110 was 010111011. The backward Turn Pool from endpoint 100 to endpoint 110 could be calculated as shown above. The Turn Pool is first written as 010 111 011, to delineate the turn values for each switch. These turn values are then rearranged, with the first value being moved to the end, and the last value being moved to the beginning, therefore yielding 011 111 010. Using the equation given earlier:

Backward turn value=#ports−forward turn value−2, the backward turn values can be calculated. Since each switch in FIG. 1 contains 8 ports, the backward turn value is simply 6 minus the forward turn value. However, since the middle turn value is all "1"s, its backward turn value is unchanged. Thus, the calculated backward turn value would be 011 111 100.

However, although it may be theoretically possible to calculate the backward turn value from the forward turn value and vice-versa, no switch is capable of performing this calculation. In order to perform this translation, the topology of the entire network, along with the configuration of each switch must be known. This level of information is not available at any given switch. Therefore, a switch cannot compute a backward turn pool from a known forward turn pool.

The Advanced Switching (AS) specification also allows for a mechanism, known as Status Based Flow Control (SBFC), for informing upstream switches of congestion. Using this mechanism, a downstream node explicitly informs an upstream node which of its output ports are congested. This can be accomplished in the form of a message telling the sender to stop transmitting, followed by a second message telling it to resume when the congestion is resolved. Alternatively, the destination might transmit a message telling the source to stop transmitting packets for a specific time period.

FIG. 6 illustrates the format of an AS Data Link Layer Packet (DLLP), used to inform an upstream switch of congestion in one or more output ports. In accordance with the AS and PCI Express specifications, a DLLP is always preceded by a special identifier, known as a k-code. In the case of DLLPs, the special identifier is known as START DLLP and referred to as K28.2 in these specifications. Similarly, each DLLP is followed by a second special identifier, known as END and referred to as K29.7 in these specifications. More detailed information about the format and values of these k-codes can be found in the PCI Express specification.

Referring to FIG. 6, Bits <31:29> of the first double word are used to identify the type of DLLP. This 3-bit field allows eight possible values, with a value of 5 used to identify Status Feedback DLLPs. Bits<27:26> describe the action that the upstream switch must take in response to the reported congestion. The following table explains the four possible actions:

| Bits <27:26> | Action |
|---|---|
| 00 | XON: Enable transmissions to the port |
| 01 | Short XOFF: Disable transmissions to the port for a short timeout period |
| 10 | Long XOFF: Disable transmissions to the port for a long timeout period |
| 11 | Persistent XOFF: Disable transmissions to the port until a subsequent DLLP with Bits<27:26> = 00 |

Bits <25:18> identify the congested output port. This value is expressed as a forward routed turn value. Eight bits are used, since the largest defined switch in AS contains 256 ports.

Bit <17> is used to identify the Ordered Only flag for the congested output port. In accordance with the specification, there are some classes of traffic which must be delivered in the order in which they were sent. These are referred to as "ordered only" traffic classes. The assertion of this bit indicates that this packet belongs to such a traffic class.

Bits <16:9> represent the mask for the eight possible traffic classes. Typically, within a network or network fabric system, there may be different classes of traffic. For example, video traffic is deemed to be very time critical, as any delay in its transmission will result in lost frames and a distorted image. Therefore, the system, by the utilization of distinct traffic classes, can guarantee that video traffic will receive a guaranteed amount of bandwidth. Similarly, voice contains time critical information, although perhaps slightly less time critical than video. Traffic classes can also be used to support isochronous traffic, whereby the class gets a fixed allocation of bandwidth at regular time intervals. Other types of data, such as status information, may be delivered on a best effort basis, where this is typically the lowest class. The classification of traffic provides a mechanism for the network to automatically prioritize packets as they are transferred through the network. In many traditional systems, traffic classes define specific quality of service parameters, such as latency through the network. Networks achieve the required quality of service parameters by applying weights to each class of traffic. For example, a packet of the highest traffic class destined for a specific output port may be allowed to move ahead of all other packets waiting to be transmitted via that output port. Often this mechanism is implemented through multiple queues per output port, where each queue is allocated a specific percentage of the total bandwidth for that output port.

Traffic classifications are also necessary in network fabrics to eliminate the possibility of deadlock, or heavy congestion. By assigning network administration and status messages a high traffic class, they can bypass other information. Using this mechanism, a message notifying an upstream device about congestion can be sent immediately, allowing the device to modify its delivery profile.

It is possible that the congestion at a particular port only exists for a specific traffic class, while the others are still free to transmit. This field identifies the traffic classes affected by the congestion. While eight traffic classes are defined by the Advanced Switching specification, it is permissible that, due to implementation constraints, some switches do not employ separate queues for each traffic class. For example, a switch may group together the lowest three traffic classes into a single set of queues. In this case, once one of these three classes becomes congested, all three are congested since they share common queues. By implementing a bit map to identify the congested traffic classes, a switch is able to inform the upstream switch of all traffic classes which are impacted with a single message.

Following these 32 bits, a 16-bit CRC (Cyclic Redundancy Code) is transmitted. CRCs are used to provide for error detection and are well known within the art. The specific implementation of this CRC is not important to the present invention.

Advanced Switching (AS) specifies the use of this DLLP for a downstream switch to communicate to its immediate upstream neighbor any congested port information. A brief description of the use of DLLPs is provided in reference to FIG. 1.

Assume that switch 40 experiences congestion at its output port 3 while attempting to transmit packets to endpoint 130. Congestion can be determined using a number of different techniques. One such mechanism is to monitor the contents of each queue. To avoid congestion, the rate at which a queue transmits information must be equal to or greater than the rate at which it receives information. If this criteria is met, then the queue will remain empty at most times. Ideally, the queue is not empty only when it is actively receiving, or has just received a packet, since immediately after receipt, the new packet will be transmitted. However, if the queue is unable to transmit packets at the rate at which they are received, the queue will begin filling. Thus, while the rate at which packets are received is greater than the rate at which they are transmitted, the queue will fill. If the available capacity of the queue drops below a threshold value, a determination is made that the port is congested. This threshold value can be predetermined, programmable or can be adaptively changed based on the overall queue usage in the switch. The determination of the optimal threshold value is an implementation decision. If the threshold is set such that it is reached when the queue is nearly full, there may be cases where the queue overflows, since packets that are already in transit cannot be stopped quickly enough. Conversely, if the threshold is set such that it is reached when the queue still contains ample available space, there may be transient conditions when the port is unnecessarily considered congested. Having determined that congestion exists, the switch then generates a DLLP which it sends to switch 30. That DDLP would contain the following bit fields:

| Bits  | Field              | Value       | Comments                                                                    |
|-------|--------------------|-------------|------------------------------------------------------------------------------|
| 31:29 | DLLP Type          | 5           | Defined as Status Feedback Type                                              |
| 28    | VB                 | 0           | Only the first port is valid                                                 |
| 27:26 | XOFF               | 01, 10 or 11| Switch 40 can choose any of these three actions for switch 30 to take        |
| 25:18 | Port A Turn Number | 2           | From switch 30's perspective, the congested port has a turn number of 2     |
| 17    | O                  | Any         | This field defines the ordered order field of the congested port             |
| 16:9  | TCMask             | Any         | This field defines the traffic classes that are congested                    |
| 8:0   | Reserved           | Any         | This field is reserved and not used                                          |

Switch 30 receives the DLLP described above, and stores the relevant information concerning the congested port in a memory element inside the switch.

Whenever switch 30 receives a packet that it is to transmit via its output port 4, it compares the next turn of the packet to its list of known congested ports. As described in reference to FIG. 4, switch 30 is able to ascertain its output port by using the Turn Pointer and Turn Pool fields found in the header of the incoming packet. However, to implement the congestion management mechanism, the switch must also identify the output port of the next downstream switch, since all DLLPs refer to the downstream switch's ports.

During initialization of the fabric, each switch becomes aware of the configuration of its neighboring switches. In this case, switch 30 knows the configuration of both switch 20 and switch 40. Switch 20 knows the configuration of switch 30; however, it is unaware of the configuration of switch 40, since they are not adjacent. Similarly, switch 40 knows the configuration of switch 30, but not switch 20.

Once switch 30 examines the header of the incoming packet to determine its output port, it decrements the Turn Pointer field as described above and prepares the packet for transmission. Before transmission, it determines the output port that will be used by switch 40, by looking at the modified Turn Pointer, the Turn Pool, and the configuration information that it has concerning the port count of switch 40. If this output port is the same as that identified in the DLLP, then switch 30 will not transmit the packet until the port is no longer congested. However, switch 30 is capable of sending packets to switch 40 that are not intended for output port 3, since it has the ability to identify the output port that will be used by switch 40. Therefore, all packets intended for endpoint 140 and endpoint 150 are unaffected by the congestion at endpoint 130.

Similarly, since switch 30 is aware of the configuration of switch 40, it can also identify backward routed packets destined for output port 3. Using the formulas and manipulations illustrated earlier, switch 30 can use the modified Turn Pointer, the Turn Pool, and the information that it has about the number of ports in switch 40 to determine the equivalent forward routed turn value, which it then compares to the value in the DLLP.

The mechanism defined in the AS specification works effectively in this scenario. However, assume that the congestion at output port 3 of switch 40 persists for an extended period of time. At some point, switch 30 will have queued a significant number of packets that cannot be delivered to switch 40 because of this congestion. When the available capacity of this queue in switch 30 has dropped below a threshold value, it must inform switch 20 to stop sending packets destined for output port 3 of switch 40. However, the format of the DLLP does not permit switch 30 to inform switch 20 of congestion in switch 40. Rather, in accordance with the AS specification, switch 30 generates a DLLP that informs switch 20 to stop sending packets destined for its output port 4. The specific values of the bit fields are generated similarly to those shown above and thus are not repeated here.

At this point, switch 20 stops transmission of all packets that are destined for output port 4 of switch 30. However, since DLLPs can only identify congested paths, many packets that could have been transmitted are now held in switch 20. For example, all packets destined for endpoint 140 and endpoint 150 cannot be transmitted because of congestion at endpoint 130. Thus, the inability of the DLLP to specify congested paths causes packets that could have been transmitted to be delayed because of downstream congestion along other unrelated paths.

The present invention allows the communication of congested paths to upstream switches, thereby only restricting the transmission of those packets that are actually destined for a congested path.

The Advanced Switching specification also defines other types of packets that can be transmitted between switches. As previously described, the primary mechanism for communicating status feedback information is in the form of DLLPs. Another format of messages, known as Transaction Layer Packets (TLPs) also exists.

Transaction Layer Packets are defined in the PCI Express specification, and are used to communicate a variety of different types of information between nodes in the system. Like DLLPs, TLPs are always preceded by special k-code identifiers, which allow the switch to quickly interpret the incoming packet and process it accordingly. TLPS are preceded by a k-code known as START TLP and referred to as K27.7 in the PCI Express specification. The END k-code that was used with DLLPS, K 29.7, is also used to end TLP transmissions. In the case of TLPs, since the arrival of packets is guaranteed, as opposed to best effort with DLLPs, a two byte sequence number follows the START TLP k code. More information about these extra bytes can be found in the PCI Express specification.

In accordance with the AS specification, all TLPs use an AS Route header, as illustrated in FIG. 3, which defines the type of message and the path it is to travel through the fabric. In addition to the Turn Pool and Turn Pointer, described earlier, there are a number of other relevant fields. First, bits<6:0> define the Protocol Interface (PI) field 701. This field represents the various types of packets that can be encapsulated by this header. While 128 possible values are defined, many of these are implementation or vendor specific. Several others are reserved for configuration purposes, such as path building.

By making use of a currently reserved PI value, it is possible to create status based flow control messages throughout the fabric that explicitly identify congested paths. Switches that currently exist would ignore this TLP, since the PI value is unknown. FIG. 7 illustrates a TLP which allows such communication to occur.

The PI field 701 of the first double word 700 is set to a value of 000111 (7), denoting that this packet contains information about AS fabric management. Since this is a unique packet type, the fields that follow can be defined as required in accordance with the invention. The second double word 730, gives the value of the forward Turn Pool which identifies the congested path. Since it is not possible for a switch to convert a forward Turn Pool into a reverse Turn Pool, the next double word 740 contains the reverse Turn Pool. Bits<24:20> of double word 700 define the path size 720. Path size 720 represents the number of bits in double words 730 and 740 that are valid. Since it is a 5-bit field, it is capable of representing up to 31 bits, which is the maximum size of the Turn Pools. Bits<31:25> of double word 700 contains the header CRC 725, in accordance with the AS specification.

Bit<12> of double word 700 contains the "Ordered Only" flag 717, as described in reference to FIG. 6, and serves the same purpose in this packet.

Bits<19:16> and bits<11:8> represent the traffic class 705 of the congested flow, or flows. Since there are eight defined traffic classes, each bit is used to represent whether that particular class is impacted by congestion. For example, the assertion of bit<18> and bit<9> of double word 700, which represents bit<6> and bit<1> of traffic class 705, indicates that traffic classes 6 and 1 are congested, while the other traffic classes are unaffected.

As described above, a bit mask for traffic classes is used because some switches, due to implementation constraints, do not implement separate queues for each traffic class. Rather, these switches will group several traffic classes together and utilize a common set of queues for this group. Consequently, these grouped traffic classes will become congested at the same time.

By utilizing a bit map, it is possible to communicate information about all eight traffic classes simultaneously. Alternatively, a three-bit field could be used to denote the binary value of the traffic class that is congested. However, this embodiment would require multiple TLPs to be sent if a group of traffic classes are congested. The embodiment shown in FIG. 7 can communicate the same information in one TLP.

Bits<15:14> are used to represent the XOFF 715, or Xon action, to be taken by the upstream switch in response to this TLP. The following table lists the possible actions:

| Bits <15:14> | Action |
|---|---|
| 00 | XON: Enable transmissions to the congested path |
| 01 | Short XOFF: Disable transmissions to the congested path for a short timeout period |
| 10 | Long XOFF: Disable transmissions to the congested path for a long timeout period |
| 11 | Persistent XOFF: Disable transmissions to the congested path until a subsequent TLP with Bits<15:14> = 00 |

This representation uses the same actions that are defined in the AS specification for Status Based Flow Control DLLPs, as shown in FIG. 6. Without departing from the spirit of the invention, alternate actions could be defined. Furthermore, the action could simply be implied. For example, the receipt of this TLP could automatically always disable transmissions for a long timeout period, without this information being explicitly represented in the packet.

While a preferred embodiment of the TLP is illustrated in FIG. 7, bit positions can be relocated, fields can be eliminated and other bit fields added without departing from the spirit of the invention. The essential aspects of the TLP as defined is that it communicates the impacted traffic class or classes, the forward routed congested path, the backward routed congested path and identifies an action, whether implied or explicit, that the upstream switch should take in response to this TLP packet.

Having defined a format for the communication of congested paths, it is necessary to define the method by which these messages are created, modified and forwarded throughout the network.

Referring to FIG. 1, assume that endpoint 130 encounters congestion. Over time, the queue for output port 3 of Switch C 40 starts filling and reaches its threshold level. It then determined the port is encountering congestion, and Switch C 40 sends a DLLP as described above to Switch B 30, informing it to stop delivering packets destined for output port 3. Having done this, all other paths are free to continue transmitting information. However, if the path to endpoint 130 continues to remain congested, eventually the queue for output port 4 of Switch B 30 will start filling and may reach its threshold value. Traditionally, this would initiate another DLLP to be sent to Switch A 20, informing it to stop delivering packets destined for its output port 4. However, this message blocks more traffic than necessary, since the only congested path is that associated with output port 4 of Switch B 30 in conjunction with output port 3 of Switch C 40. However, DLLPs cannot transmit this amount of information, so the fabric begins operating at a lower overall bandwidth because of a single congested path.

Using the message format illustrated in FIG. 7, it is possible to overcome this shortcoming. Field 701 is set to 000111 (7) to indicate that this is a special congestion message. When Switch B 30 determines that it has reached a certain threshold and should not accept any more messages for its queue associated with output port 4 which are destined for output port 3 of Switch C 40, it generates a special message, using the format of FIG. 7. Switch B 30 is aware that output port 3 of Switch C 40 is congested, and is aware that the forward turn value of output port 3 is 010(2). It is also aware that the backward turn value of output port 3 is 100(4) in this example. Similarly, it is aware that its output port 4 has a forward turn value of 011(3) with respect to the output port 0 which it shares with Switch A 20. Likewise, output port 4 has a backward turn value of 011(3) with respect to output port 0. Using this information, it is able to construct the required fields 730 and 740. Field 730, which represents the forward Turn Pool would have a value of 011 010, which signifies a clockwise turn value of 3 for Switch B and a clockwise turn value of 2 for Switch C. Field 740, which represents the backward Turn Pool would have a value of 100 011, which signifies a counterclockwise turn value of 4 for Switch C and a counterclockwise turn value of 3 for Switch B. Since there are 6 bits that are now valid in the Turn Pools, field 720 is set to 6. Once the various fields are completed, the message is forwarded to Switch A 20. Switch A 20 interprets the information that was sent and is able to more precisely block transmission of packets. For example, rather than simply blocking packets destined for output port 4 on Switch B 30, it can now further qualify that to include only packets destined for output port 3 on Switch C 40.

Suppose that the offending path between Switch C 40 and endpoint 130 continues to remain congested, such that the queue for Switch 20 A begins filling and reaches its threshold value. Suppose that endpoint 100 continues to send packets destined for endpoints 130 and 150. One of these paths is not congested, while the other path is congested. Switch A 20 can then create a message for endpoint 100 informing it of the congested path in the network. Beginning with the message and the Turn Pool values that it received, Switch A can append new information to these values and forward a new message to endpoint 100.

The value of the forward turn number from the ingress port for endpoint 100 and the egress port for Switch B is 010(2). Similarly, the backward turn number is 100(4). To create the forward Turn Pool, Switch A appends the forward turn number 010 in front of the existing Turn Pool, using the Turn Pointer as an index to determine the correct placement. Therefore, the forward Turn Pool becomes 010 011 010. To create the backward Turn Pool, Switch A shifts the current backward Turn Pool by the number of bits that it uses to identify its turn value (in this case, 3). It then inserts the backward turn value of 100 into the last three bits of the Turn Pool, thus creating a backward Turn Pool of 100 011 100. Switch A then increments the Turn Pointer by 3, since it has added 3 bits to both Turn Pools. This message is then delivered to endpoint 100.

This mechanism can also be applied to fabrics and paths supporting loopback. Referring again to FIG. 1, assume that all switches support loopback, and that endpoint 100 is attempting to send multiple packets to endpoint 110 via switch 30. In this case, switch 20 is both upstream and downstream from switch 30, because the packet passes through switch 20 twice. However, the mechanism to generate and communicate congested paths is identical to the non-loopback scenario described earlier. Assume that endpoint 110 becomes congested. At a later point in time, the output queue in Switch 20 associated with output port 0 will start filling, and reach a threshold indicating that it should not receive additional packets destined for endpoint 110. In response to this, in accordance with the AS specification, switch 20 will generate a DLLP message and forward this to switch 30. Since endpoint 100 is continuing to send packets, at a later time, the output queue in switch 30 associated with port 0 will began filling and reach a threshold value. In response to this, it will generate a TLP. The TLP is created as described above, with the forward path defined as the forward turn value used in switch 30 (111, as defined for loopback), followed by the forward turn value used in switch 20 (011). Similarly, the backward path is defined as the backward turn value used by switch 20 (011), followed by the backward turn value used by switch 30 (111, as defined for loopback). This TLP is then forwarded to switch 20, even though switch 20 is the source of the original congestion.

The packets from endpoint 100 continue to be transmitted until the queue in switch 20 associated with this congested path fills and reaches a threshold value. At this point, switch 20 generates a new TLP, further defining the congested path. The forward path is defined as the forward turn value used by switch 20 to send packets received from endpoint 100 to switch 30 (010), followed by the forward path received in the previous TLP, thus resulting in a complete forward path of 010111011. Similarly, the backward turn value (100) is placed after the backward turn path received in the previous TLP, thus resulting in a complete backward path of 011111100. This new TLP is then transmitted to endpoint 100.

While these examples show a fabric of only three switches, the invention is not so limited. The message format is capable of supporting a Turn Pool of up to 31 bits, using the format illustrated in FIG. 7.

Alternatively, the TLP mechanism described above can be used in place of the Status Based Flow Control DLLP packet. The information that is transmitted in the DLLP packet can also be transmitted via the TLP mechanism. Instead of creating a DLLP in response to the determination that an output queue is filling, the switch would construct a TLP message, inserting only its forward and backward turn values as the Turn Pool values, and the number of bits used in those fields.

This description is in no way meant to limit the current invention to this, or any particular method of constructing the TLPs of the present invention. In one embodiment, the modifications to the Turn Pool and Turn Pointer of the outgoing TLP are implemented at wire speed, as the TLP is being transmitted. In an alternate embodiment, the outgoing TLP is constructed within the switch using logic and memory cells, and transmitted after the modifications have been completed. In a third embodiment, a combination of these methods is used. The exact method used to create the TLP is an implementation design decision, based on many factors.

What is claimed:

1. A method comprising:
a first network device sending packets received from a second network device to a third network device via a first port of the first network device, wherein one or more of the packets are destined for a downstream node; and
in response to the first network device receiving a first congestion message from the third network device that identifies a congested port of the third network device, the first network device sending a second congestion message to the second network device, wherein the second congestion message indicates congestion on at least a portion of a network path from the first network device to the downstream node via the congested port, and wherein the second congestion message includes a first value that identifies the congested port of the third network device and includes a separate second value that identifies the first port of the first network device.

2. The method of claim 1, wherein the first value is a first turn value that specifies a relative position of the congested port of the third network device with respect to an input port of the third network device, and wherein the second value is a second turn value that specifies a relative position of the first port of the first network device with respect to a second port of the first network device.

3. The method of claim 2, wherein the second congestion message is sent to the second network device via the second port of the first network device.

4. The method of claim 2, wherein the first turn value is a forward turn value of the congested port, wherein the second turn value is a forward turn value of the first port, and wherein the forward turn value of the first port, followed by the forward turn value of the congested port define a forward routed path of a congested path.

5. The method of claim 2, wherein the first turn value is a backward turn value of the congested port, wherein the second turn value is a backward turn value of the first port, and wherein the backward turn value of the congested port, followed by the backward turn value of the first port define a backward routed path of a congested path.

6. The method of claim 1, further comprising:
determining that available space in an output queue associated with the first port of the first network device is below a threshold, and wherein said sending is in response to the determination.

7. A network device comprising:
a first port; and
control logic configured to:
send packets received from an upstream network device to a downstream network device via the first port, wherein one or more of the packets are destined for a downstream node; and
in response to receiving a first congestion message from the downstream network device that identifies a congested port of the downstream network device, send a second congestion message to the upstream network device, wherein the second congestion message indicates congestion on at least a portion of a network path from the upstream network device to the downstream node via the congested port, and wherein the second congestion message includes a first value that identifies the congested port of the downstream network device and includes a separate second value that identifies the first port.

8. The network device of claim 7, further comprising:
a second port;
wherein the first value is a first turn value that specifies a relative position of the congested port of the downstream network device with respect to an input port of the downstream network device, and wherein the second value is a second turn value that specifies a relative position of the first port of the network device with respect to the second port of the network device.

9. The network device of claim 8, wherein the first turn value is a forward turn value of the congested port, wherein the second turn value is a forward turn value of the first port, and wherein the forward turn value of the first port, followed by the forward turn value of the congested port define a forward routed path of a congested path.

10. The network device of claim 8, wherein the first turn value is a backward turn value of the congested port, wherein the second turn value is a backward turn value of the first port, and wherein the backward turn value of the congested port, followed by the backward turn value of the first port define a backward routed path of a congested path.

11. The network device of claim 7, wherein the first congestion message is a data link layer packet, and wherein the second congestion message is a transaction layer packet.

12. The network device of claim 7, further comprising:
a queue configured to hold packets to be delivered via the first port;
wherein the control logic is configured to determine whether available space in the queue is below a threshold and to send the second congestion message in response to the available space being below the threshold.

13. A method comprising:
in response to one or more packets sent to a downstream node, a first network device receiving a congestion message from a second network device, wherein the congestion message includes a first value that identifies a congested port of a third network device and includes a separate second value that identifies a first port of the second network device, wherein the congestion message indicates congestion on at least a portion of a network path from the second network device to the downstream node via the congested port of the third network device; and
in response to receiving the congestion message, the first network device blocking transmission of additional packets destined for the congested port of the third network device via the first port of the second network device without blocking transmission of additional packets destined for other ports of the third network device via the first port of the second network device.

14. The method of claim 13, wherein the first value is a first turn value that specifies a relative position of the congested port of the third network device with respect to an input port of the third network device, and wherein the second value is a second turn value that specifies a relative position of the first port of the second network device with respect to a second port of the second network device.

15. The method of claim 14, wherein the congestion message is sent to the first network device via the second port of the second network device.

16. The method of claim 14, wherein the first turn value is a forward turn value of the congested port, wherein the second turn value is a forward turn value of the first port, wherein the forward turn value of the first port, followed by the forward turn value of the congested port define a congested path from the first network device through the third network device.

17. The method of claim 14, wherein the first turn value is a backward turn value of the congested port, wherein the second turn value is a backward turn value of the first port, and wherein the backward turn value of the congested port, followed by the backward turn value of the first port define a congested path from the third network device to the first network device.

18. A first network device, comprising:
a port configured to receive a congestion message sent from a second network device based at least in part on one or more packets arriving at a downstream node, wherein the congestion message includes a first value that identifies a congested port of a third network device and includes a separate second value that identifies a first port of the second network device, wherein the congestion message indicates congestion on at least a portion of a network path from the second network device to the downstream node via the congested port of the third network device; and
control logic configured to block, in response to receiving the congestion message, transmission of additional packets destined for the congested port of the third network device via the first port of the second network device without blocking transmission of additional packets destined for other ports of the third network device via the first port of the second network device.

19. The first network device of claim 18, wherein the first value is a first turn value that specifies a relative position of the congested port of the third network device with respect to an input port of the third network device, and wherein the second value is a second turn value that specifies a relative position of the first port of the second network device with respect to a second port of the second network device.

20. The first network device of claim 19, wherein the congestion message is sent via the second port of the second network device.

21. The first network device of claim 19, wherein the first turn value is a forward turn value of the congested port of the third network device, wherein the second turn value is a forward turn value of the first port of the second network device, wherein the forward turn value of the first port, followed by the forward turn value of the congested port define a congested path from the first network device through the third network device.

22. The first network device of claim 19, wherein the first turn value is a backward turn value of the congested port of the third network device, wherein the second turn value is a backward turn value of the first port of the second network device, and wherein the backward turn value of the congested port, followed by the backward turn value of the first port define a congested path from the third network device to the first network device.

* * * * *

UNITED STATES PATENT AND TRADEMARK OFFICE
CERTIFICATE OF CORRECTION

PATENT NO. : 7,957,293 B2
APPLICATION NO. : 12/692183
DATED : June 7, 2011
INVENTOR(S) : Mayhew It is certified that error appears in the above-identified patent and that said Letters Patent is hereby corrected as shown below:

Column 1, line 4, below "Title" insert -- CROSS REFERENCE TO RELATED APPLICATION --.

Signed and Sealed this
Fourth Day of October, 2011

David J. Kappos
*Director of the United States Patent and Trademark Office*